United States Patent [19]

Hoehn et al.

[11] 3,982,079
[45] Sept. 21, 1976

[54] TOUCH-TO-ROTARY CONVERTER FOR A TELEPHONE INSTRUMENT

[75] Inventors: Steven Jon Hoehn, Redwood City; Joseph Monroe Jackson, Menlo Park, both of Calif.

[73] Assignee: Litton Business Telephone Systems, Inc., Sunnyvale, Calif.

[22] Filed: Apr. 16, 1975

[21] Appl. No.: 568,601

[52] U.S. Cl. .......................... 179/81 R; 179/16 EC; 179/90 K
[51] Int. Cl.² ........................................ H04M 1/272
[58] Field of Search ........... 179/16 R, 16 A, 16 AA, 179/16 EC, 81 R, 90 R, 90 K

[56] References Cited
UNITED STATES PATENTS

| | | | |
|---|---|---|---|
| 3,270,144 | 8/1966 | Vogel et al. ............... | 179/16 A |
| 3,538,256 | 11/1970 | Lucas ........................ | 179/90 K |
| 3,653,038 | 3/1972 | Webb et al. ................ | 179/90 K |
| 3,686,444 | 8/1972 | Stevenson .................. | 179/81 R |
| 3,686,445 | 8/1972 | Barnaby et al. ............ | 179/90 K |
| 3,787,639 | 1/1974 | Battrick ..................... | 179/90 K |
| 3,856,982 | 12/1974 | Lawson et al. ............. | 179/90 R |
| 3,879,584 | 4/1975 | McCabe et al. ............ | 179/90 K |
| 3,881,070 | 4/1975 | McCabe et al. ............ | 179/90 K |

OTHER PUBLICATIONS

Norelco "Prestafone" Technical Bulletins, North American Philips Corp., Form SB-17-01 and SB-17-02, Received Apr. 30, 1973.

Pulse, Digital, and Switching Waveforms, Millman & Taub, 1965, p. 335.

*Primary Examiner*—Kathleen H. Claffy
*Assistant Examiner*—Randall P. Myers
*Attorney, Agent, or Firm*—Ronald M. Goldman

[57] ABSTRACT

A touch type dial digit selector to rotary type dial digit sender converts touch type dial input information to a rotary type dial output and includes a touch type selector pad having the ten digit selecting push buttons arranged in four rows and three columns and associated row and column switches, an encoder for converting the information represented by the operation of the row and column switches into a four-bit binary code, a storage and pulsing circuit for receiving the digit information, and providing at an output the series of pulses representative of the dialed number. The storage and pulsing circuit includes a strobe input for initiating the registration of the input information by the storage and pulsing circuit. Means responsive to the concurrent operation of at least one row switch and at least one column switch of said touch type selector provide a strobe pulse to said strobe input at the end of a predetermined time interval greater than N seconds.

1 Claim, 1 Drawing Figure

U.S. Patent   Sept. 21, 1976   3,982,079
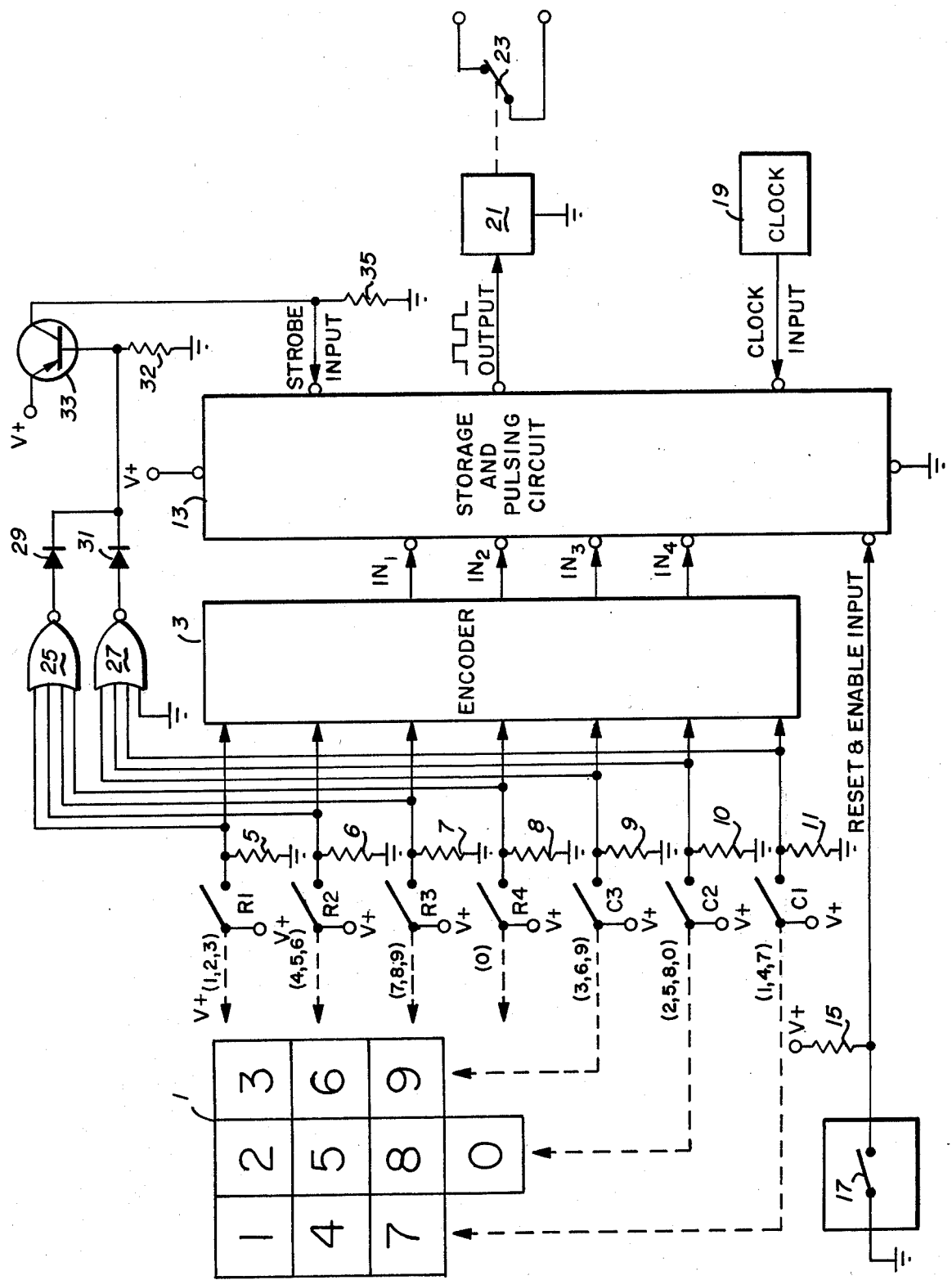

TOUCH-TO-ROTARY CONVERTER FOR A TELEPHONE INSTRUMENT

BACKGROUND OF THE INVENTION

Dial digit information, representative of the numbers of a called telephone station, is presently sent from a telephone by one of two commercially accepted methods. The oldest type employs a standard rotary dial and ancillary apparatus. In the standard rotary type dial systems, digit information is sent as a set of pulses generated by having the dial pulsing contacts interrupt the telephone line a number of times equal to the number of the dialed digit. The second is the touch and tone type dial and ancillary apparatus. In the touch type system, the digit information is sent as a parallel combination of selected audio frequency signals assigned to the number of the dialed digit actuated by depressing the push button associated with the number of the digit dialed. The touch type dial consists of a selector pad having a series of ten push buttons arranged in rows and columns with each push button representative of a particular number of from one to ten (zero). A multifrequency signal generator is associated with the push-buttons to produce a characteristic audio signal or tone for each of the numbers.

The central telephone exchange must have the necessary equipment for deciphering these two types of signals. Unfortunately, many existing telephone exchanges do not possess the equipment for deciphering tone type dialing information signals and decipher only rotary dial type signals. Hence, telephone users in those telephone exchange areas not having the tone type deciphering equipment who wish to use a touch type dial for ease and convenience, must use a presently existing device known as a touch-to-rotary converter. Devices of this type respond to the operation of a touch type switch operated by the telephone user but send a series of pulses like the rotary dial instead of the multifrequency tones.

One existing touch-to-rotary converter is specified in an application note of the General Instrument Company, Hicksville, New York. The application note describes a storage and pulsing circuit using an integrated circuit, Model No. AY5-9100. This stores binary input information sequentially applied to its input and sends series of pulses representative of the binary information. The note specifies the ancillary component apparatus necessary to manufacture a touch-to-rotary converter. As previously described in part, the touch type selector pad or dial, as variously termed, has ten push buttons arranged in rows and columns, more particularly, in four rows and three columns. Four "row" switches and three "column" switches are associated with the push buttons. These switches are typically of a leaf-spring construction. Each individual push button, when depressed, actuates a corresponding one of the row switches and one of the column switches and the common switch. As presented in the cited application note, the storage and pulsing circuit of the integrated circuit, No. AY5-9100, has a "strobe" input and requires a synchronizing or strobe input signal to actuate the memory within the integrated circuit so that the circuit accepts the binary code information of the dialed digit as presented at an input. For this purpose the application note specifies that the common switch associated with the touch type dial pad be coupled to the strobe input. In such a structure, misalignment due to assembly tolerances or metal fatigue of the leaf-spring switches on the touch type selector pad may cause misdialing. For example, if a selected push button is depressed and the common switch closes prior to or coincident with the associated row or column switches, the storage and pulsing circuit may record in its memory erroneous information.

SUMMARY OF THE INVENTION

Accordingly, an object of our invention is to provide an improved touch-to-rotary converter which eliminates the possibility of misdialing resulting from assembly errors in the touch type dial and which, incidental thereto, eliminates the need for a common switch associated with the touch type of dial. In our invention we employ in the aforedescribed prior touch-to-rotary converter, a circuit which responds to the operation, jointly, of at least one row switch and one column switch associated with the touch type dial for providing a pulse input to the strobe input of the storage and pulse integrated circuit at a predetermined interval of time subsequent to the application of the digit representative information to the input of the storage and pulsing circuit and delete the connection between the strobe input and the common switch of the touch type dial. More particularly, in a touch-to-rotary converter which includes a series of four switches operable in response to operation of any push button in one of four rows and a series of three column switches responsive to operation of any switches in corresponding three columns, an encoder responsive to the operation of a row and column switch for providing a 4-bit binary output representative of a number associated with the push button and an integrated circuit digit storage and pulsing circuit having an information input for receiving the digit number information, a clock input for receiving clock synchronizing and tuning signals, a pulse output for sending series of pulses representative of numbers and a strobe input for receiving a command signal necessary to register information at the input, said storage and pulsing circuit having an input delay of N seconds; first gate means responsive to operation of any one of said row switches for producing an output; second gate means for producing an output in response to operation of any one of said column switches; third gate means for producing an output only in response to the joint outputs of said first and second gates, said third gate means having an inherent delay of at least N seconds before producing an output. Accordingly the circuit ensures the presence of the number information at the input to the storage and pulsing circuit before that information is registered without the need for a common switch on the touch type dial.

The foregoing objects and advantages of our invention, and the structure characteristic of our invention, hereinbefore summarized, is better understood by reading the more detailed description of a preferred embodiment of our invention, which follows, considered together with the schematic illustration of that embodiment presented in the figure of the accompanying drawing.

DESCRIPTION OF THE PREFERRED EMBODIMENTS

The preferred embodiment of our improved touch-to-rotary converter presented in the accompanying FIGURE of the drawing includes a conventional touch type dial 1 containing ten push buttons, symbolically illustrated by the series of ten squares designated 1 through 0 and arranged in four rows and three columns representative of the ten individual push buttons. The touch type dial includes a series of seven normally open electrical switches designated R1, R2, R3, R4, C1, C2 and C3. Each of the switches containing an R designation is associated with a particular row and each containing a C designation is associated with a particular column, as illustrated by the dash lines directed to the rows and columns. Switch R1 is mechanically coupled to each of the push buttons identified with the digits 1, 2 and 3 in the first row and is operable to the closed position upon depression of any of the three push buttons representative of the numbers 1, 2 and 3. Column switch C1 is associated with the switches in the third column and is operable to the closed position upon depression of any of the three push buttons representative of the numbers 3, 6 and 9. The remaining switches are similarly associated with one or more push buttons in the touch type pad. For further reference to the details of this conventional device, the reader may make reference to the prior art literature and existing telephone sets. The common switch associated with the conventional touch type dial is deleted as it is not necessary to the invention. Similarly, the converter is installed in a conventional telephone instrument. Since the structure of the telephone is well known and inasmuch as most of the details thereof are not necessary to an understanding of the invention, the telephone is not illustrated or described, except in those few instances where a part of the telephone adds to clarity of the present invention.

The movable switch contact of each of the row and column switches is connected to a source of voltage +V. An encoder 3, symbolically illustrated, is provided. The encoder is of a conventional circuit structure, which typically employs a series of diodes, and contains seven inputs and four outputs for converting the input number information to a 4-bit binary signal. The fixed contact of each of the switches R1, R2, R3, R4, C1, C2 and C3 is electrically connected to a corresponding one of the inputs to the encoder, as illustrated. Bias resistors, substantially of identical electrical resistance, 5, 6, 7, 8, 9, 10 and 11, are connected electrically in between a corresponding one of the encoder inputs and ground or electrical reference potential, as variously termed, as illustrated by the conventional graphic symbol. A storage and pulsing circuit is symbolically illustrated by a rectangle 13. This is an integrated circuit element such as is available, by way of example, from the General Instrument Company, Hicksville, New York, as integrated circuit Model No. AY5-9100. Circuit 13 includes four inputs which are coupled to the corresponding one of the four outputs from the encoder 3, contains suitable power supply input terminals for connection to a voltage source +V and to ground, contains a clock input, a reset and enable input and a sync or strobe input, and contains an output terminal. The reset and enable input of circuit 13 is connected via a resistor 15 to source +V and is additionally connected in electrical series circuit with a normally open telephone hookswitch 17, schematically illustrated, of the telephone instrument to electrical ground potential.

An electrical clock generator of any suitable type, 19, suitably connected to a power source in a known manner, is coupled at its output to the clock input of circuit 13.

The pulse output of circuit 13 is connected to a relay driver 21, symbolically represented. The contacts 23 of the relay driver are normally closed and are connected in series circuit with the telephone line, not illustrated, in a conventional manner.

A first Nor gate 25 and a second Nor gate 27 of conventional structure are provided. These may be of the CMOS type Motorola No. 14002. Nor gate 25 contains four inputs and each input thereof is connected to a corresponding one of the switches R1 through R4. Correspondingly each of three inputs of Nor gate 27 are connected to the output of the column switches C1, C2 and C3. Inasmuch as the Nor gate 27 is of a conventional structure it has an excess gate and this is connected to ground as illustrated. The output of Nor gates 25 and 27 are coupled in series with diodes 29 and 31, respectively, to one end of resistor 32, and the other end of resistor 32 is connected to ground. A transistor 33, suitably a PNP type, has its base connected to the ungrounded end of resistor 32, has its emitter connected to the source of voltage +V, and has its collector connected in series with a resistor 35 to ground. The diodes, resistors and transistor form a Nand gate as is understood by those skilled in the art. Additionally the collector of transistor 33 is connected electrically to the strobe input of circuit 13. The gates 25 and 27 selected should have and has an inherent delay time of at least 50 nanoseconds but less than the time it would take a person to operate a push button switch twice in a row estimated at 150 milliseconds.

The transistor, diodes and associated parts are recognized as an Or gate and is used in equivalent form as a Nand gate.

In operation, the telephone user removes the telephone handset, not illustrated, from its cradle on the telephone set, also not illustrated, and hookswitch 17 thereby closes its contacts to complete a ground connection to the enable input of storage and pulsing circuit 13. With ground applied to that input, circuit 13 is ready to receive, store and send information in the form of electrical signals. The user depresses the appropriate sequence of push buttons on touch dial 1, representative of the numbers of the digits of the telephone which the user intends to call. The operation of each push button in the touch type dial closes momentarily one of the normally open row switches, R1 through R5, and one of the column switches, C1 through C3. Taking the number 5, by way of example, as the first dialed digit, switches R2 and C2 close momentarily during the time in which the associated push button "5" is depressed. Closure of switch R2 couples the voltage from source +V to the one input of encoder 3 corresponding to switch R2. Similarly closure of switch C2 connects source +V to another input of encoder 3. The encoder, as is conventional, provides a four-digit binary output in dependence upon the appearance of ground at any two of the selected seven inputs. As is familiar to those skilled in the art this is a coding of voltage "highs" and "lows", or "1" and "0" as variously termed, with the number 5 represented by the 4 digits of 0101. The electrical potentials representative of that information are then coupled into the corresponding four inputs of the storage and pulsing circuit. Currently the aforedescribed closure of switch R2 places the high voltage of +V at one input of Nor gate 25 and the closure of switch C2 places the high voltage of +V at one input of Nor gate 27. The output of each of Nor gates 25 and 27 is normally high when all of its inputs are at a voltage low, such as occurs with all switches R1-R4 and C1-C3 unoperated via ground through the bias resistors 5 through 11. However, if a voltage high is applied to any one of those inputs, then the gate output is switched to a voltage low. The output of gates 25 and 27 is fed to the Or gate used in a Nand function consisting of the diodes 29 and 31, resistors 32 and 35, and transistor 33. The logic of this circuit is that the output as appears at resistor 35 is a voltage low unless both inputs are at a voltage low. Thus with both outputs low, the bias voltage across resistor 32 is lowered sufficiently to bias transistor 33 from its "Off" or nonconducting condition into the "On" or current conducting condition, producing a current through resistor 35 and causing the voltage thereacross to be a voltage high. As may be noted, if the output of only one Nor gate is low, then the input to the Or gate, as measured by the voltage drop across resistor 32, remains at a voltage high and transistor 33 remains in the electrically nonconducting state. This ensures that a false number is not recorded or sent unless both an R and C switch are operated.

The transistor base circuit and its output suffers a delay in that the transistor 33 switches on and conducts current through resistor 35 only after the lapse of a predetermined interval after the application of bias voltage to the transistor base. By design, the particular circuit gates 25 and 27 and transistor are chosen to have a time delay of greater than 50 nanoseconds but less than 150 milliseconds. Thus a high input is applied to the strobe input of storage and pulsing circuit 13 at a time greater than 50 nanoseconds and only when at least one of the row switches and column switches have actually operated. Storage and pulsing circuit 13 operates in a conventional manner described in the literature. Properly connected to the power supplies and enabled and receiving the clock input signals from clock 19 the information sequentially presented at its input is registered, stored and then sent as a series of one or more pulses properly spaced in time. Thus the storage and pulsing circuit deciphers the combination of binary signals at its input, determines the digital number represented thereby and sends out a series of properly formed pulses in serial order representative of that signal.

Inasmuch as the telephone user can depress a series of push buttons to enter the plural digits of a called number at a faster rate than rotary type dial pulses can be sent, storage and pulsing circuit 13 registers the information on each dialed digit in serial order within its memory and sends each digit on a first-in first-out basis as a pulse or series of pulses corresponding to the number entered on that digit.

For each push button depressed on entering subsequent digits, a similar sequence occurs in which both a row switch and a column switch must be operated in order for the storage and pulsing circuit to receive the digit information and the strobe input is applied only after a sufficient time delay necessary to ensure stabilization of the input to circuit 13.

The pulse output of circuit 13 drives relay 21 to open and then close its contacts 23 for each pulse of the series of pulses to imitate the operation of the pulse contacts of a rotary dial. Given the example of "5" the output of the circuit 13 is a series of five pulses and relay contacts 23 open and then close five times.

Upon completion of the telephone call, the user replaces his telephone handset in the cradle of the telephone set. This opens hookswitch 17 and removes ground from the reset and enable input of pulsing circuit 13. With ground removed, the input is at a voltage high from source +V through resistor 15, and this potential resets circuit 13 in preparation for subsequent use.

As is apparent, our invention eliminates the need for a common switch on the touch type pad as the source of synchronizing or strobe signal. Moreover, the circuit ensures that before a digit of a dialed number is recorded in the pulsing circuit that it is necessary for both inputs from the touch pad to be applied before the information is registered upon application of a strobe input signal. Incorrect information as might be generated through actuation out of sequence of one of the row switches and one of the column switches in which an incomplete signal is present at the input to the storage and the premature application of a strobe signal to the strobe input of the circuit 13 is entirely avoided.

It is believed that the foregoing description of a preferred embodiment of our invention is sufficient in detail to enable one skilled in the art to make and use our invention. However it is expressly understood that our invention is not to be limited to those details inasmuch as various substitutions of equivalent parts, improvements, and additions thereto based upon and embodying the invention become known to those skilled in the art upon reading this specification.

Accordingly it is requested that our invention be broadly construed within the full spirit and scope of the appended claims.

What we claim is:

1. A touch-to-dial pulse selecting and sending combination for a telephone instrument having:

a touch type selector pad having a plurality of push buttons arranged in a plurality of rows and columns;

a first plurality of switches, each one of said switches being associated with a corresponding one of said rows of push buttons for operation in response to depression of any push button in said respective row;

a second plurality of switches, each one of said switches being associated with a corresponding one of said columns of push buttons for operation in response to depression of any push button in said respective column;

encoder means, having input means containing a plurality of inputs corresponding in number to the sum of said first and second plurality of switches and an output means, for converting touch signals at said input means represented by an operated one of said first plurality of said switches and an operated one of said second plurality of switches to a coded number information signal at said output means;

means coupling each of said switches in circuit with a corresponding one of said input means of said encoder means;

storage and pulsing circuit means having an input for receiving coded number information signals, said storage and pulsing circuit means further having an output for providing a series of pulses corresponding in number to the number information previously presented at its said input, and said storage and pulsing circuit means further having a strobe input for receiving a strobe signal for registering coded number information presented at said input within said storage and pulsing circuit means;

means coupling said output means of said encoder means to said input of said storage and pulsing circuit means; and relay means, said relay means being coupled to said output of said storage and pulsing circuit means responsive to pulses therefrom for opening a contact for the duration of each pulse;

the improvement comprising in combination therewith: strobe means responsive to the concurrent operation of at least one of said first plurality of switches and at least one of said second plurality of switches for providing a signal to said strobe input of said storage and pulsing circuit means at the end of a predetermined time interval greater than 50 nanoseconds and less than 150 milliseconds, said strobe means comprising:

first Nor gate means for providing an output in response to the operation of any one of said first plurality of row switches;

second Nor gate means for providing an output in response to the operation of any one of said second plurality of column switches; and third Nand gate means responsive to concurrent outputs from said first gate means and said second gate means for providing an output at a predetermined interval of time thereafter to said strobe input, said third Nand gate means including:

first resistor means;

first and second diode means; and transistor means having an emitter, base, and collector;

said first diode being connected in between the output of said first gate and said resistor and said second diode being connected in circuit between the output of said second gate and said resistor;

second resistor means;

means connecting a voltage source, said emitter, collector and said second resistor means in a series circuit;

means connecting said transistor base in circuit with said first resistor means for applying any voltage thereacross to said base;

whereby said transistor is switched between its non-conductive state in dependance upon the voltage at the base thereof being greater or less than, respectively, a predetermined level to generate said strobe input signal at said collector.

* * * * *